United States Patent
Kwong et al.

(10) Patent No.: US 8,964,436 B2
(45) Date of Patent: *Feb. 24, 2015

(54) SELF-STARTING TRANSISTOR-ONLY FULL-WAVE RECTIFIER FOR ON-CHIP AC-DC CONVERSION

(71) Applicants: Kwok Kuen (David) Kwong, Davis, CA (US); Kwai Chi Chan, Hong Kong (HK); Yunlong Li, Hong Kong (HK); Lee L. Yang, Hong Kong (HK)

(72) Inventors: Kwok Kuen (David) Kwong, Davis, CA (US); Kwai Chi Chan, Hong Kong (HK); Yunlong Li, Hong Kong (HK); Lee L. Yang, Hong Kong (HK)

(73) Assignee: Hong Kong Applied Science & Technology Research Institute Company, Limited, Hong Kong (HK)

( * ) Notice: Subject to any disclaimer, the term of this patent is extended or adjusted under 35 U.S.C. 154(b) by 187 days.

This patent is subject to a terminal disclaimer.

(21) Appl. No.: 13/653,016

(22) Filed: Oct. 16, 2012

(65) Prior Publication Data

US 2014/0104910 A1  Apr. 17, 2014

(51) Int. Cl.
*H02M 7/5387* (2007.01)

(52) U.S. Cl.
USPC ............................................................ 363/132

(58) Field of Classification Search
USPC ................ 363/34, 37, 65, 125–127, 131, 132
See application file for complete search history.

(56) References Cited

U.S. PATENT DOCUMENTS

| | | | | |
|---|---|---|---|---|
| 4,170,747 A * | 10/1979 | Holmes | .......................... | 315/307 |
| 4,336,586 A | 6/1982 | Lunn | | |
| 4,454,573 A * | 6/1984 | Petsch et al. | .................... | 363/98 |
| 4,471,269 A * | 9/1984 | Ganser et al. | ................ | 315/307 |
| 4,535,275 A * | 8/1985 | Muller | ...................... | 318/400.29 |
| 4,597,026 A * | 6/1986 | Santurtun et al. | ............. | 361/101 |
| 4,734,624 A * | 3/1988 | Nagase et al. | ................ | 315/243 |
| 4,748,532 A * | 5/1988 | Commander et al. | .......... | 361/31 |
| 4,931,676 A * | 6/1990 | Baiocchi et al. | .............. | 327/434 |
| 5,063,490 A * | 11/1991 | Maehara et al. | ................ | 363/37 |
| 6,349,047 B1 | 2/2002 | Yu | | |
| 6,563,726 B1 | 5/2003 | Hirst | | |
| 7,616,462 B2 * | 11/2009 | Millner et al. | .................. | 363/63 |
| 7,852,644 B2 | 12/2010 | Larson, III | | |
| 8,258,852 B2 | 9/2012 | Leung et al. | | |
| 2003/0155896 A1* | 8/2003 | Ezio et al. | ..................... | 323/280 |

FOREIGN PATENT DOCUMENTS

CN  101621059A A  1/2010

* cited by examiner

*Primary Examiner* — Adolf Berhane
*Assistant Examiner* — Gary Nash
(74) *Attorney, Agent, or Firm* — Stuart T. Auvinen; gPatent LLC (57) ABSTRACT

A transistor-based full-wave bridge rectifier is suitable for low A.C. input voltages such as received by a Radio-Frequency Identification (RFID) device. Voltage drops due to bridge diodes are avoided. Four p-channel transistors are arranged in a bridge across the A.C. inputs to produce an internal power voltage. A comparator receives the A.C. input and controls timing of voltage boost drivers that alternately drive gates of the four p-channel transistors with voltages boosted higher than the peak A.C. voltage. Four diode-connected transistors are connected in parallel with the four p-channel bridge transistors to conduct during initial start-up before the comparator and boost drivers operate. Substrates are connected to the power voltage on the power-voltage half of the bridge and to the A.C. inputs on the ground half of the bridge to fully shut off transistors, preventing reverse current flow. The transistor bridge can be integrated onto system chips.

20 Claims, 8 Drawing Sheets

PRIOR ART

SELF-STARTING TRANSISTOR-ONLY FULL-WAVE RECTIFIER FOR ON-CHIP AC-DC CONVERSION

FIELD OF THE INVENTION

This invention relates to rectifiers, and more particularly to rectifier bridges using transistors without diode voltage drops.

BACKGROUND OF THE INVENTION

One of the smallest electronic devices in widespread use is a Radio-Frequency Identification (RFID) tag. Rather than run on battery power, power is applied from an external source, such as an RFID reader or scanner. A small antenna on the RFID tag or device receives radio waves from the RFID reader. The received RF waves are rectified by an Analog Front End (AFE) to create a power-supply voltage. The AFE also extracts a coded signal that carries instructions or commands from the RFID reader.

Figure 1:
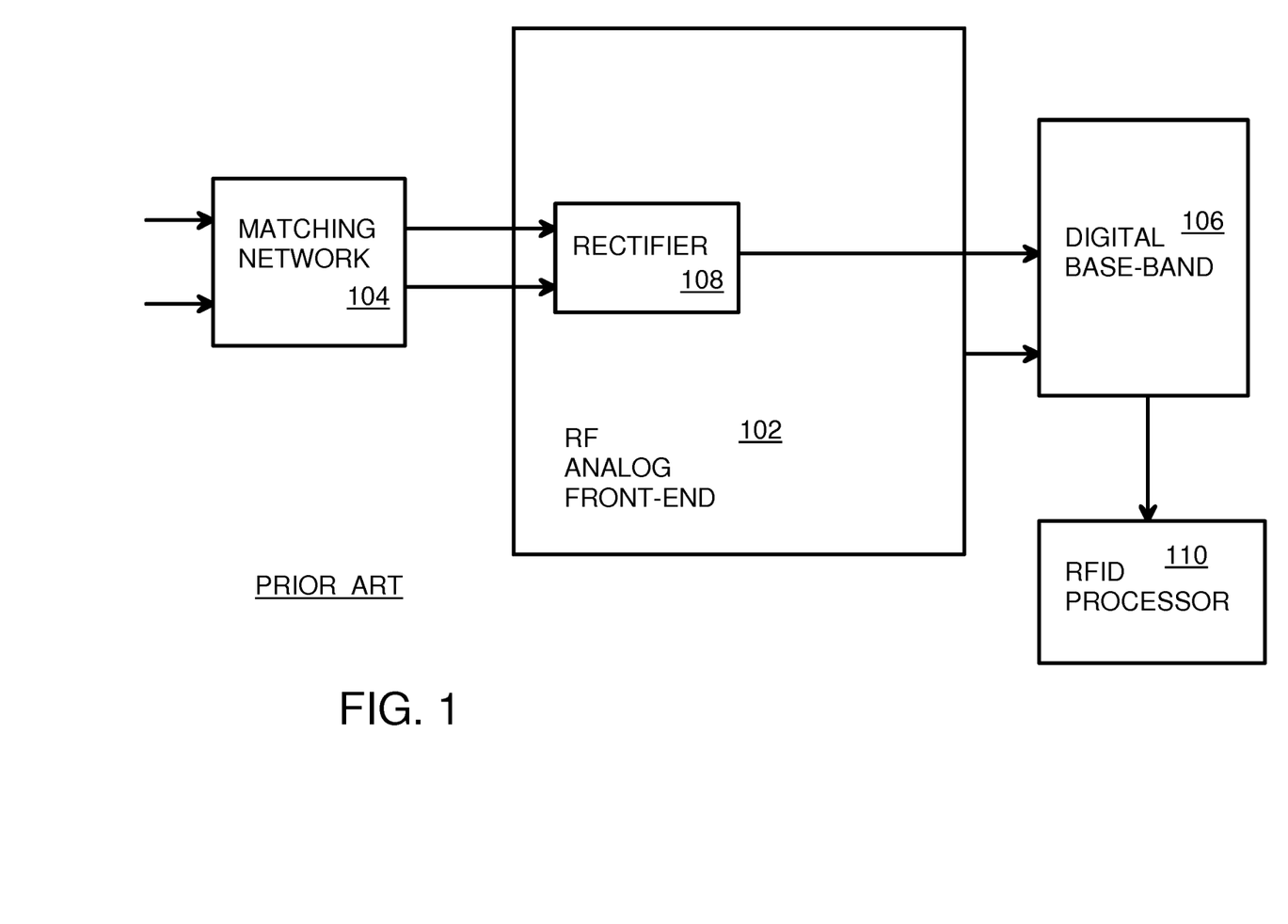
FIG. 1 shows a RFID device that generates power by rectifying received RF waves.

FIG. 1 shows a RFID device that generates power by rectifying received RF waves. Matching network 104 is connected to a small antenna on the RFID device. The received RF signal is applied to rectifier 108 inside RF analog front-end 102. Rectifier 108 generates a power-supply voltage and current that powers RF analog front-end 102, digital baseband 106, and RFID processor 110, which may be integrated together as a single silicon chip, or may be separate chips. RF analog front-end 102 also extracts a signal that is carried by the RF waves, which may be encoded using a simple NRZ coding or using more complex coding schemes.

Figure 2A:
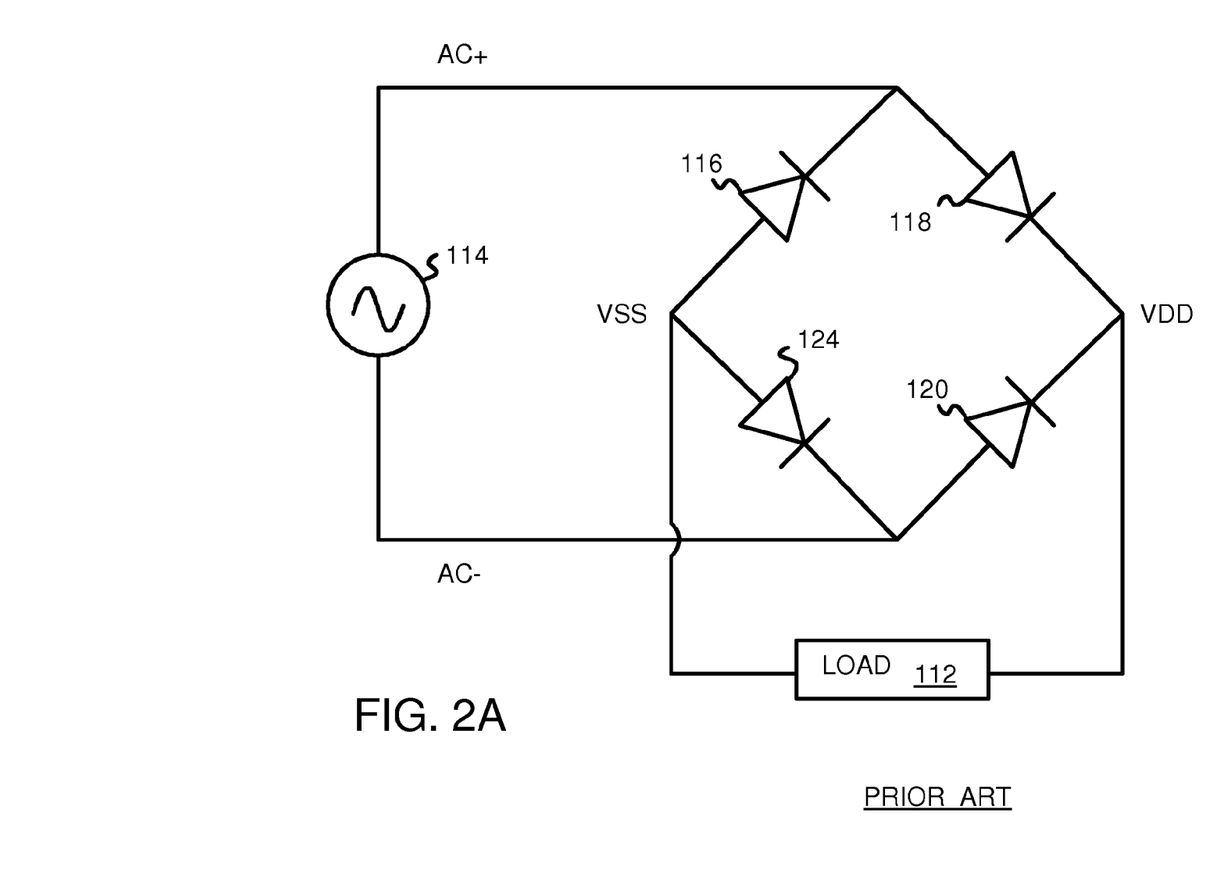
FIG. 2A shows a prior-art diode rectifier bridge circuit.

FIG. 2A shows a prior-art diode rectifier bridge circuit. Alternating-current source 114 produces an alternating wave such as sine waves on its AC+, AC− terminals. A full-wave rectifier bridge circuit is formed by diodes 116, 118, 120, 124 which are connected across terminals AC+, AC−. Load 112 is connected across intermediate nodes VDD, VSS in the diode bridge. Load 112 may be a resistor or may be a dummy load that represents a large electrical system load that is powered by VDD.

During a first phase of the AC wave, when AC+ is positive and AC− is negative, current flows from AC+, through diode 118 to VDD, then through load 112 to VSS, and finally through diode 124 to AC−. During a second phase of the AC wave, when AC+ is negative and AC− is positive, current flows from AC−, through diode 120 to VDD, then through load 112 to VSS, and finally through diode 116 to AC+.

Traditionally, alternating-current source 114 is an A.C. current such as from a 120-volt A.C. electrical wall socket. However, small electrical systems such as an RFID device is powered by a received RF signal. Since the antenna is small, the received RF signal is small and produces a relatively small voltage. Perhaps only a few volts are produced.

Diodes 116, 118, 120, 124 each produce a voltage drop of about 0.5 to 0.8 volts due to the p-n junction inside the diode. Thus VDD is one diode voltage drop below AC+, and VSS is one diode voltage drop above AC− at the peak of the first phase.

Figure 2B:
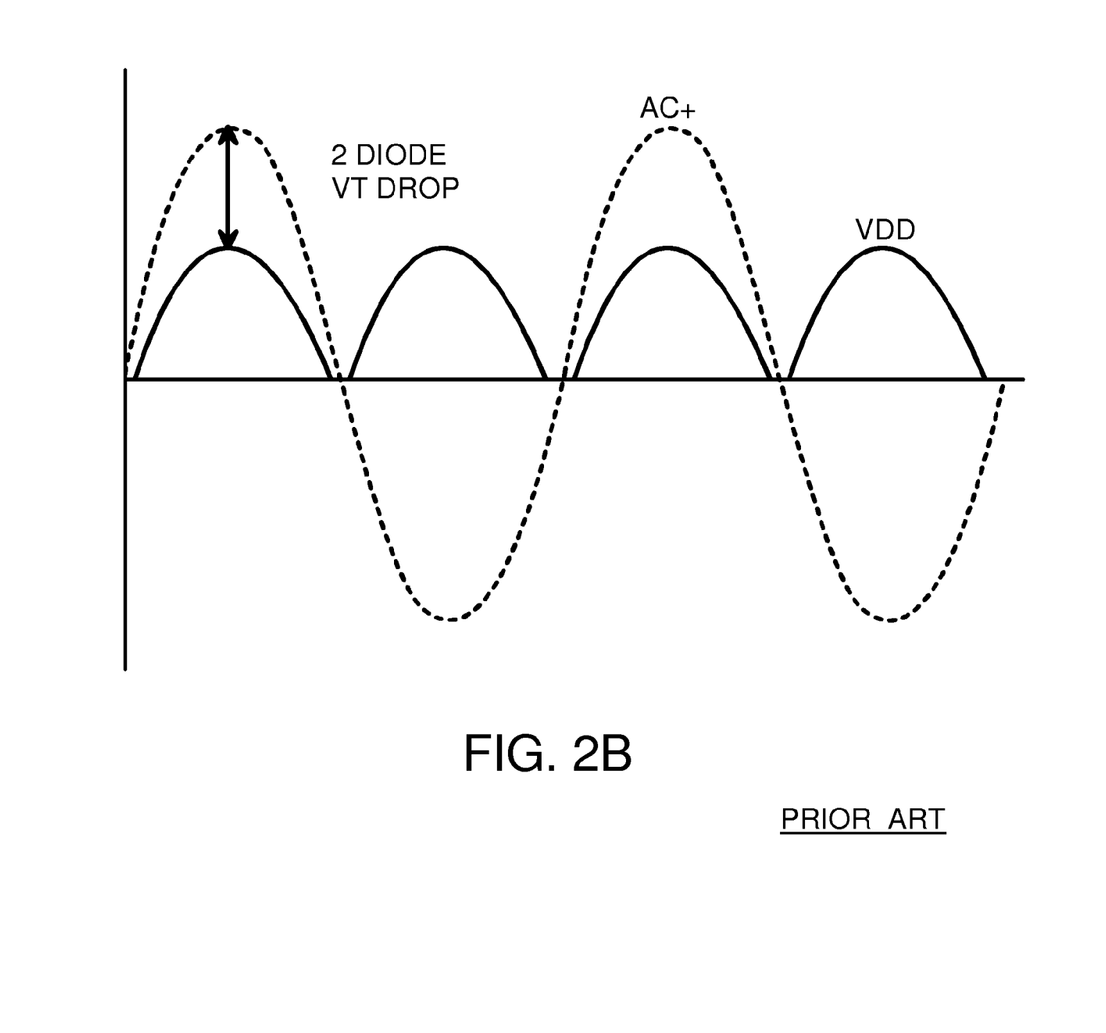
FIG. 2B shows diode voltage drops when rectifying with the diode rectifier of FIG. 2A.

FIG. 2B shows diode voltage drops when rectifying with the diode rectifier of FIG. 2A. Power-supply voltage VDD (solid line) is a rectified wave that is generated by the full wave of AC+ (dashed line) and AC− (not shown). Since the AC current passes through two diodes, VDD is reduced by a voltage drop of 2 diode junction thresholds, or 2*VT.

When the diode rectifier bridge of FIG. 2A is used as rectifier 108 in an RFID system such as shown in FIG. 1, the RF signal from matching network 104 must be at least 2*VT greater in peak voltage than the desired VDD needed to power circuits such as RFID processor 110. A further voltage loss may occur when a power capacitor is added to VDD to smooth or average the rectified wave to produce a more stable VDD. A larger antenna may be needed to capture enough RF energy to produce a sufficiently large A.C. voltage. Of course, larger antennas are undesirable.

The diode rectifier bridge may be constructed from discrete diodes rather than integrated onto a same silicon substrate as RF analog front-end 102. This is also undesirable since the discrete diodes increase the cost and size of the RFID device.

What is desired is a full-wave rectifier that does not use discrete diodes. A rectifier that uses common transistors such as complementary metal-oxide-semiconductor (CMOS) transistors is desirable so that the rectifier can be integrated onto a larger system on a chip or AFE. A full-wave bridge rectifier that uses transistors rather than diodes is desired to avoid voltage drops due to p-n junctions in the diodes. A rectifier for an on-chip AC-to-DC converter is desired that can operate with a very small A.C. voltage is desired. A self-starting transistor rectifier is also desired.

DETAILED DESCRIPTION

The present invention relates to an improvement in low-voltage rectifiers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3A:
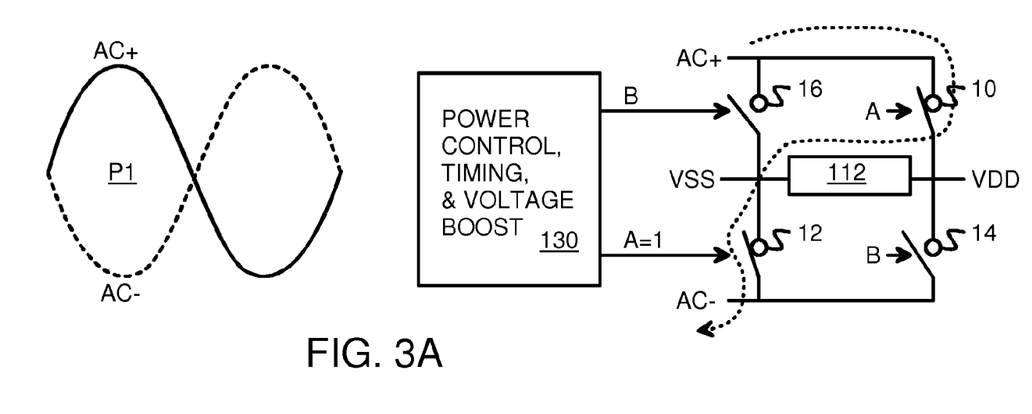
FIGS. 3A-B highlight operation of a transistor full-wave bridge rectifier.
Figure 3B:
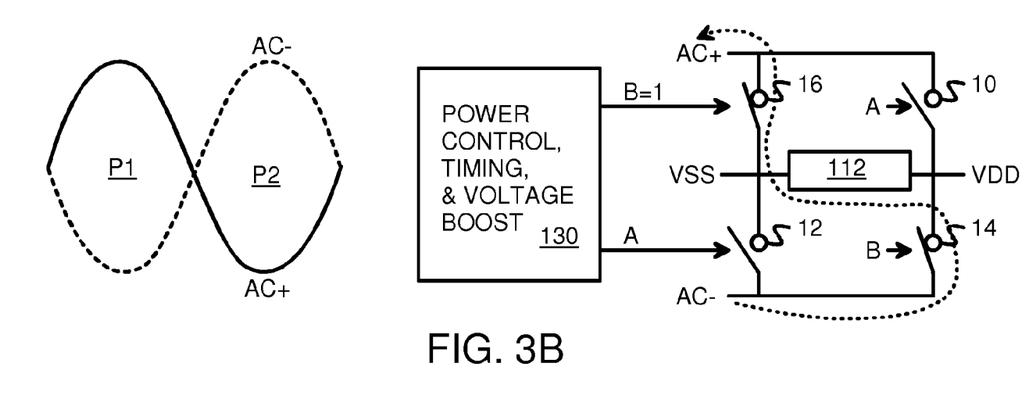

FIGS. 3A-B highlight operation of a transistor full-wave bridge rectifier. In FIG. 3A, during a first phase P1, AC+ is positive and AC− is negative in voltage. Control circuit 130 examines AC+ or AC− and generates gate control signals A, B. During phase P1, gate control signal A is active and gate control signal B is inactive. Gate control signal A closes transistors 10, 12, causing current from AC+ to pass through transistor 10, load 112, and transistor 12 to AC−. Transistors 14, 16 remain open since B is inactive.

In FIG. 3B, during a second phase P2, AC+ is negative and AC− is positive in voltage. Control circuit 130 examines AC+ or AC− and generates gate control signal A as inactive and gate control signal B as active during phase P2. Gate control signal B closes transistors 14, 16, causing current from AC− to pass through transistor 14, load 112, and transistor 16 to AC+. Transistors 10, 12 remain open since A is inactive.

The direction of current flow through load 112 is the same in both phases, from VDD to VSS. VSS is an internal ground that may or may not be directly connected to the external A.C. ground. Thus power current is provided during both phases. Control circuit 130 provides timing for gate control signals A, B, and also boosts their high voltages using a charge pump or voltage boost circuit. Since transistors rather than diodes are used, the p-n junction diode voltage drop of FIG. 2A-B is avoided. A lower voltage AC input may be used to power a circuit, such as for a RFID device.

Figure 4:
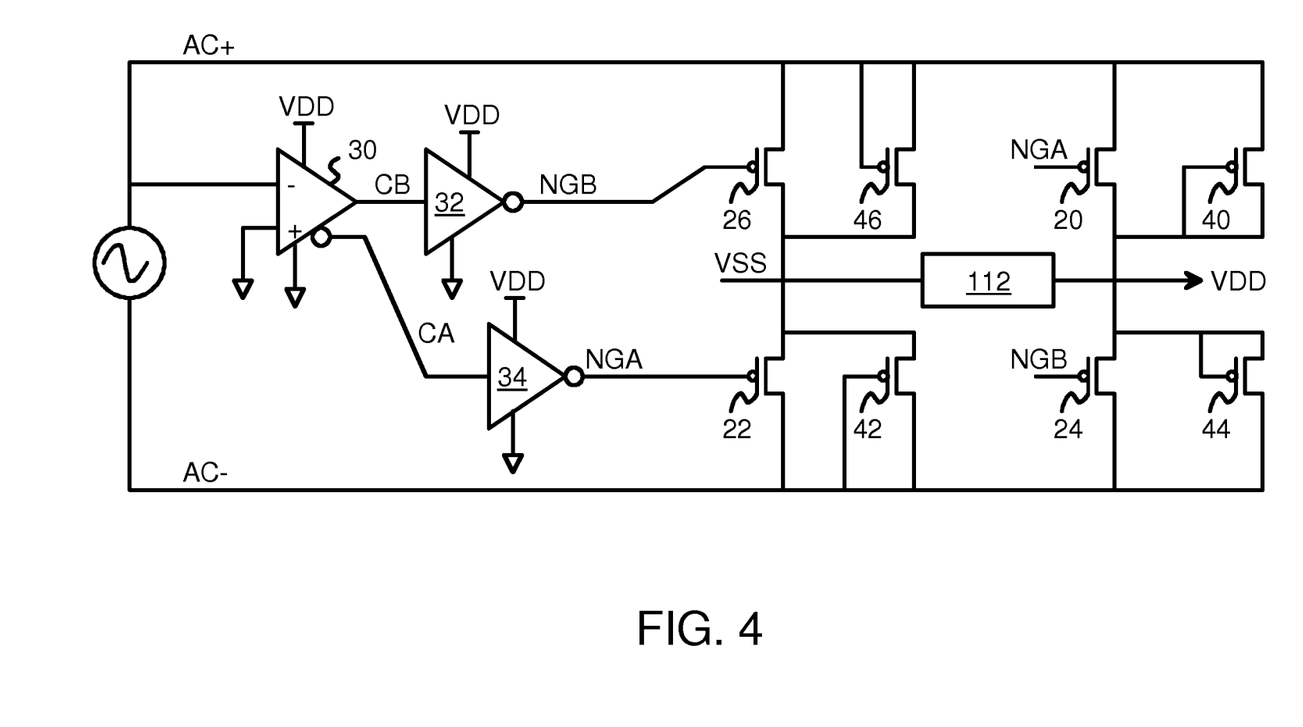
FIG. 4 is a schematic of a transistor-based rectifier bridge for a low-voltage application.

FIG. 4 is a schematic of a transistor-based rectifier bridge for a low-voltage application. A.C. input 41 can be a RF signal received on a small antenna from a RFID reader. The A.C. signal may be very low in peak voltage, such as +/−3 volts.

Comparator 30 receives AC+ on its inverting input and an external A.C. ground on its non-inverting input. Comparator 30 generates control output CB high when AC+ is below the external ground, which occurs during phase P2. Boost driver 32 inverts CB to generate gate control signal NGB.

The inverted output of comparator 30 is control signal CA, which is inverted by boost driver 34 to generate gate control signal NGA. Comparator 30 and boost drivers 32, 34 are powered by VDD, which is generated by the rectifier bridge of p-channel transistors 20, 22, 24, 26. Comparator 30 and boost drivers 32, 34 are also connected to the external A.C. ground.

The A and B gate control signals shown in FIGS. 3A-B are generated as active-low signals NGA, NGB. Gate control signal NGA is applied to the gates of p-channel transistors 20, 22, while gate control signal NGB is applied to the gates of p-channel transistors 24, 26.

When AC+ is positive and AC− is negative, during first phase P1, comparator 30 drives CB low and CA high. Boost driver 32 drives NGB high, while boost driver 34 drives NGA low, turning on p-channel transistors 20, 22. Current flows from AC+, through transistor 20, load 112, and transistor 22 to AC−. Transistors 24, 26 are kept off by NGB being driven high.

When AC+ negative is and AC− is positive, during second phase P2, comparator 30 drives CA low and CB high. Boost driver 34 drives NGA high, while boost driver 32 drives NGB low, turning on p-channel transistors 24, 26. Current flows from AC−, through transistor 24, load 112, and transistor 26 to AC+. Transistors 20, 22 are kept off by NGA being driven high.

During start-up, when A.C. power is first applied to the circuit, VDD has not yet reached a sufficiently high voltage to power comparator 30 and boost drivers 32, 34. Gate control signals NGA, NGB have not yet been driven with a sufficiently large voltage to create a gate-to-source voltage drop across p-channel transistors 20, 22, 24, 26 that exceed the transistor threshold voltage Vtp. Thus p-channel transistors 20, 22, 24, 26 remain off during this initial start-up period.

During this initial start-up period of time, rectification is provided by diode-connected transistors 40, 42, 44, 46, which form a second bridge in parallel with p-channel transistors 20, 22, 24, 26. Since the gates and drains are connected together, diode-connected transistors 40, 42, 44, 46 begin to conduct as soon as AC+ or AC− is more than the diode junction voltage of about 0.5-0.8 volts above the internal VDD, which is still very low.

For example, during startup in phase P1, when AC+ is above +0.8 volts, and AC− is less than −0.8 volts, p-channel diode-connected transistor 40 turns on when VDD and VSS are at about 0 volts. Diode-connected transistor 42 also turns on. Current can flow from AC+, through transistor 40, load 112, and transistor 42 to AC−. As AC+ slowly rises in voltage over several cycles during start-up, VDD can rise above VSS. eventually AC+ is large enough that VDD reaches a sufficiently high voltage so that comparator 30 and boost drivers 32, 34 can operate, and p-channel transistors 20, 22, 24, 26 can begin to turn on and off. Once p-channel transistors 20, 22, 24, 26 are operating, the voltage drops across their channels is reduced to below the diode junction drop, and diode-connected transistors 40, 42, 44, 46 are shut off.

A voltage booster in boost drivers 32, 34 drives NGA, NGB to a voltage above VDD, allowing p-channel transistors 20, 22, 24, 26 to turn off completely.

Figure 5:
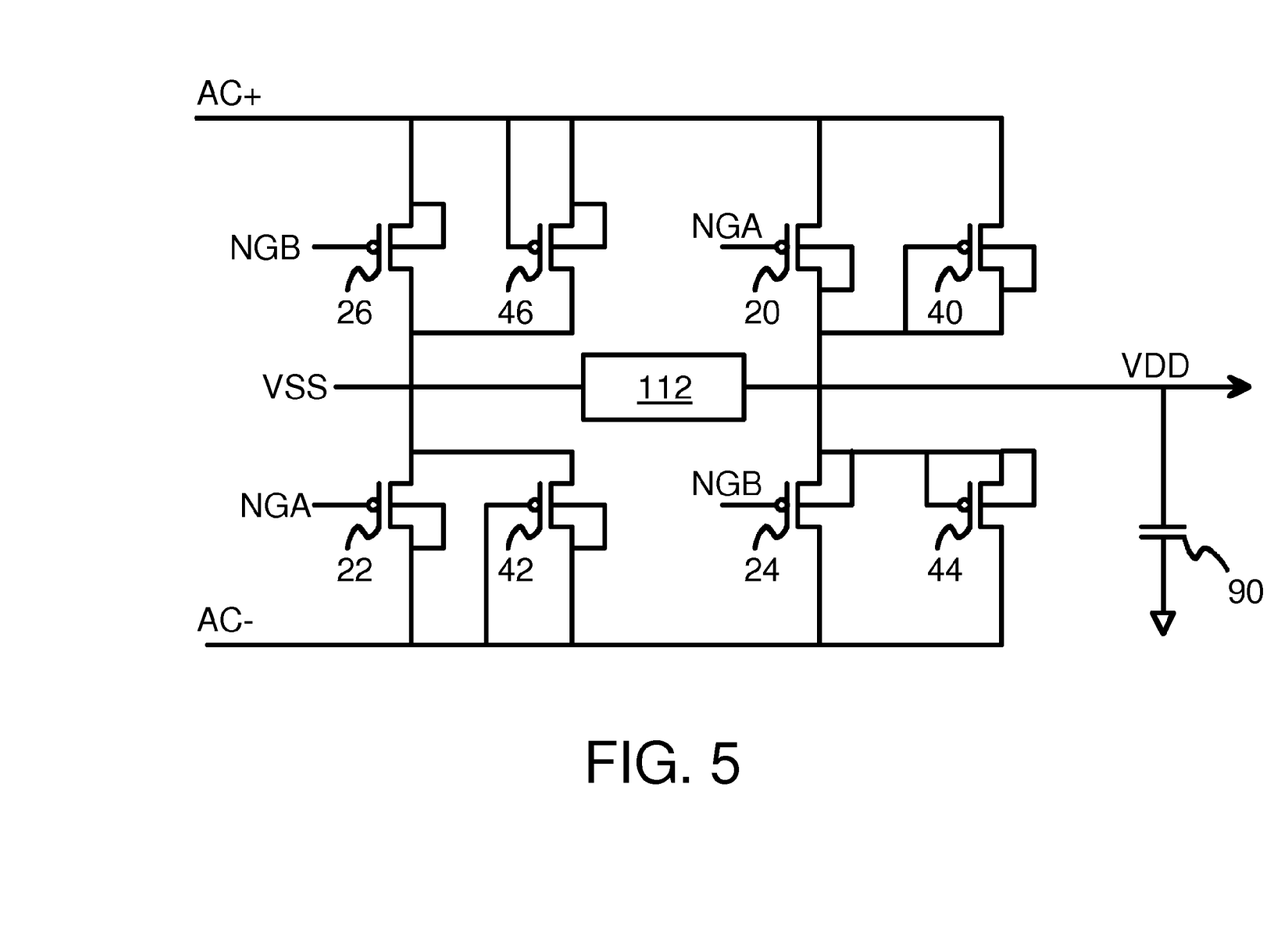
FIG. 5 is a more detailed schematic of a transistor bridge.

FIG. 5 is a more detailed schematic of a transistor bridge. Load 112 between VDD and VSS may be a dummy load that represents the loads of transistors in a large chip, such as in RF analog front-end 102. Power capacitor 90 may be added between VDD and the external ground (or between VDD and VSS) to smooth out cycle variations in the rectified wave output to produce a more stable VDD with less ripple.

The bulk, substrate, or well connections for p-channel transistors 20, 24, 40, 44 are tied to VDD. Current flows from AC+ or from AC− to VDD through these transistors. When these transistors 20, 24, 40, 44 are turned off, AC+ or AC− can have a large negative voltage. VDD is much more positive than these voltages, so VDD is considered to be the source terminal for this bias condition. The bulk terminals are therefore connected to the most positive voltage of the source and drain terminals for the shut off condition.

The bulk terminals for p-channel transistors 26, 46 are tied to AC+. Current flows from VSS to AC+ through these transistors when AC+ is negative. When these transistors 26, 46 are turned off, AC+ can have a large positive voltage, while the source terminals remain internally grounded. Thus the bulk terminals are connected to the most positive voltage of the source and drain terminals for the shut off condition.

The bulk terminals for p-channel transistors 22, 42 are tied to AC−. Current flows from VSS to AC− through these transistors when AC− is negative. When these transistors 22, 42 are turned off, AC− can have a large positive voltage, while the source terminals remain internally grounded. Thus the bulk terminals are connected to the most positive voltage of the source and drain terminals for the shut off condition.

During the initial start-up period, comparator 30 and boost drivers 32, 34 are not yet powered up and do not drive the gates of p-channel transistors 20, 22, 24, 26, so p-channel transistors 20, 22, 24, 26 may not turn on. Instead, diode-connected transistors 40, 42, 44, 46 turn on, since they do not need a gate driver circuit to operate, as their gates are connected to their drains. Once the internal power supply rises over about one volt comparator 30 and boost drivers 32, 34 can operate and drive the gates of p-channel transistors 20, 22, 24, 26. Once p-channel transistors 20, 22, 24, 26 begin conducting in the linear region, their conduction drives the drain-to-source voltage lower. As the drain-to-source voltages fall below the transistor threshold, the saturated transistors (diode-connected transistors 40, 42, 44, 46) turn off, and only p-channel transistors 20, 22, 24, 26 conduct. Thus there is no longer any diode-voltage drop within the bridge rectifier circuit.

Figure 6:
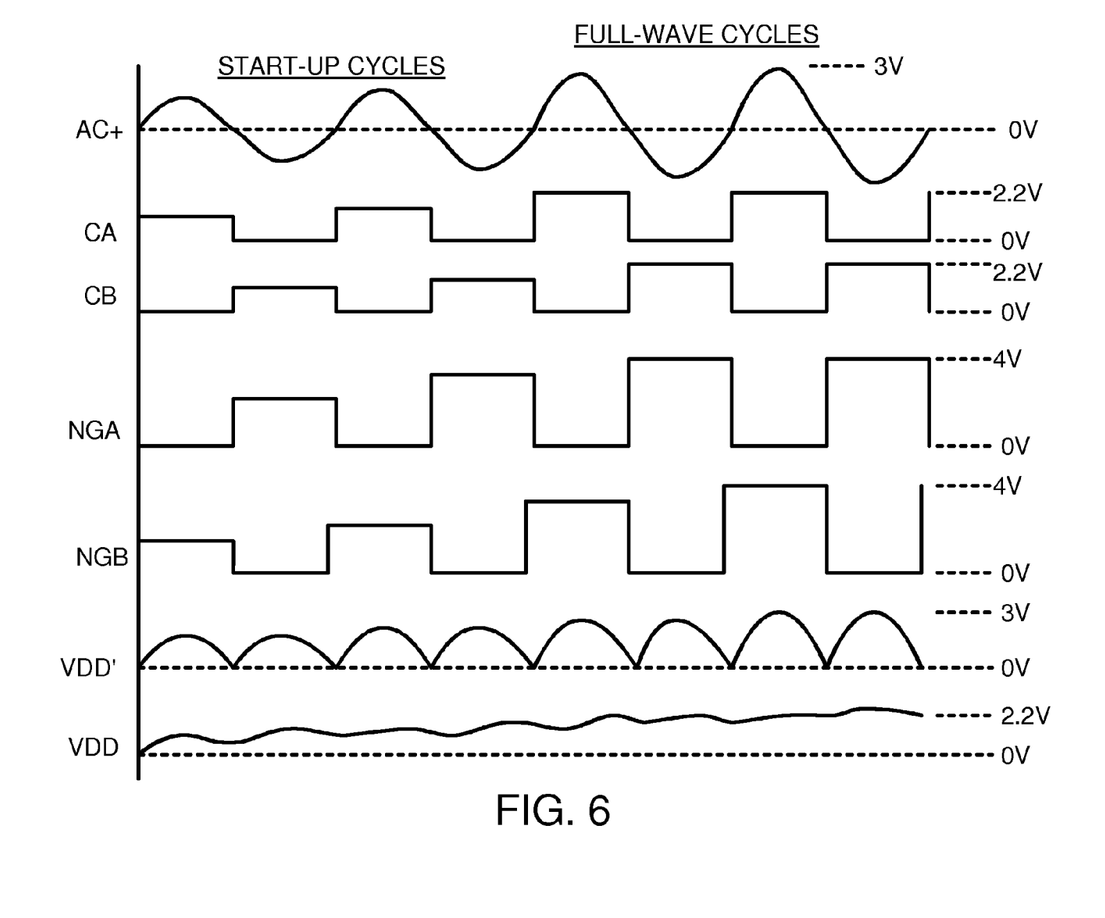
FIG. 6 is a waveform diagram illustrating operation of the rectifier circuit of FIG. 4.

FIG. 6 is a waveform diagram illustrating operation of the rectifier circuit of FIG. 4. During initialization, AC+, AC− have a reduced voltage swing, but later when initialization is complete AC+, AC− have a full swing of about +3 volt to −3 volt in this example. There may be many more start-up cycles than shown, and the voltage swing may gradually increase over these start-up cycles.

Initially, diode-connected transistors 40, 42, 44, 46 operate while p-channel transistors 20, 22, 24, 26 are shut off, allowing VDD to rise. CA, CB, NGA, NGB do not toggle during this period, which is not shown but would occur before the left side of the waveform. Once VDD has reached about 1 volt comparator 30 and boost drivers 32, 34 begin to operate.

Comparator 30 compares AC+ to ground and generates CA high and CB low during the first phase P1, and CA low and CB high during the second phase P2. As VDD rises during startup, these voltages gradually rise until swinging to a high of about 2.2 volts once VDD reaches 2.2 volts.

Boost drivers 32, 34 drive NGA and NGB to swing between ground and about 4 volts, which is above VDD and the peak A.C. voltage. This boosted gate voltage ensures that p-channel transistors 20, 22, 24, 26 turn completely off, even when AC+ or AC− is above VDD or below VSS. Note that the internal ground VSS may be floating relative to the external A.C. ground.

VDD' shows VDD when no power capacitor 90 is connected. The rectified wave swings from 0 to about 3 volts. There is no diode voltage drop. AC+ swings to a peak of 3 volts, as does the rectified wave on VDD. VDD' and VDD gradually rise during start-up cycles until a steady-state value is reached. VDD' may not be a real circuit node, but is useful for illustration purposes.

VDD shows the effect of power capacitor 90 when connected to VDD. In actual circuits, power capacitor 90 is likely to be present, either as one or more on-chip capacitors, parasitic capacitances, or an off-chip capacitor, or various combinations. The capacitance between VDD and ground stores charge during voltage peaks in VDD', and releases charge during crossover points of the A.C. signal. Thus the VDD voltage is smoothed or filtered by power capacitor 90 to reduce power ripple. In this example, an average VDD of about 2.2 volts is achieved from a 3-volt peak A.C. voltage. Other A.C. voltages and circuit designs may produce other values of VDD. The circuit designer may simulate and adjust circuit components for a desired target VDD.

Figure 7:
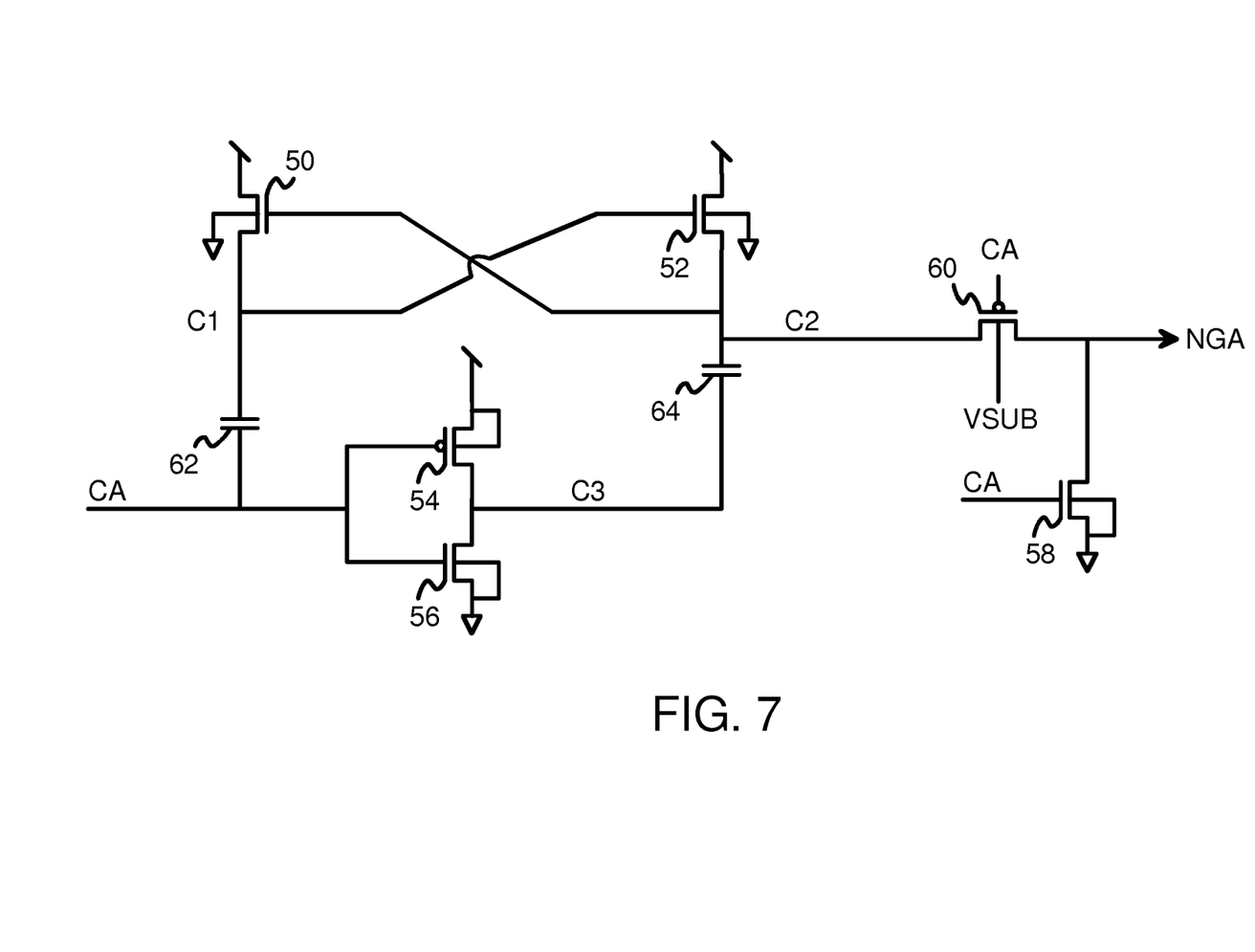
FIG. 7 is a schematic of a boost driver, such as boost driver 32 of FIG. 4.

FIG. 7 is a schematic of a boost driver, such as boost driver 32 of FIG. 4. Control signal CA pulses from ground to VDD and is inverted by p-channel transistor 54 and n-channel transistor 56 connected between VDD and ground to generate node C3. Control signal CA pumps on pump capacitor 62 while node C3 pumps on pump capacitor 64, but in opposite phases. This pumping on pump capacitors 62, 64 is coupled through to nodes C1, C2, which have n-channel transistors 50, 52 as cross-coupled loads. This forms a bistable element.

When C3 is ground, node C2 on the opposite side of pump capacitor 64 is driven to VDD through n-channel transistor 52, which has its gate pumped higher through pump capacitor 62 since CA is high. Then as C3 rises from ground to VDD, transistor 52 turns off and node C2 is pushed above VDD by pump capacitor 64. Since C3 and C2 are high and CA is low, n-channel discharge transistor 58 is off and p-channel pass transistor 60 is turned on by the low CA on its gate, allowing the boosted voltage on node C2 to pass through to gate control signal NGA.

When CA rises again, n-channel discharge transistor 58 turns on to pull gate control node NGA to ground. The high CA turns off p-channel pass transistor 60, isolating node C2 and preventing it from losing charge. Thus node C2 can be pumped up over several cycles. The boosted voltage level achieved depends on a number of design criteria, such as capacitance ratios, parasitic capacitances, transistor sizes, and the frequency of control signal CA which is determined by AC+, AC−.

The bulk terminal of p-channel pass transistor 60 is connected to node VSUB, which can be generated by a similar charge pump or boost circuit, such as a replication of pump capacitors 62, 64 and transistors 50, 52, 54, 56, with the replicated node C2 being node VSUB. The replicated circuit is still driven by control signal CA.

Alternate Embodiments

Several other embodiments are contemplated by the inventors. For example, n-channel rather than p-channel transistors may be used for p-channel transistors 20, 22, 24, 26 and for diode-connected transistors 40, 42, 44, 46, with complementing of control signals and voltages as is well known in the art.

Separate signals may be generated to drive the each gate of p-channel transistors 20, 22, 24, 26. Additional boost drivers 32, 34 may be added for separately driven gate control signals. The internal ground may be floating relative to the external ground, and p-channel transistors 20, 22, 24, 26 may turn on and off when VSS is not exactly equal to the external ground. When the internal ground is hard wired to the external ground, there may be some bias conditions when p-channel transistors 22, 26 do not turn on in the linear region, but have a diode voltage drop from operating in the saturated region. Alternately, the parallel diode-connected transistors may turn on instead. The range of boost voltages may be adjusted, such as to swing down to −1 volt instead of 0 volt, to more fully turn on transistors 22, 26. Also, a parasitic source-to-bulk diode in transistor 22 may turn on to clamp VSS to near zero volts.

Comparator 30 may connect to AC− rather than to AC+. Rather than compare to ground, another fixed voltage may be used for the reference voltage into comparator 30. A common-mode voltage such as an average between AC+ and AC− may be used as the reference input to comparator 30. Comparator 30 and boost drivers 32, 34 may connect to the external A.C. ground, or to the common-mode voltage, or to the internal ground VSS, or to another voltage. There may be several internal ground busses, such as for digital ground, analog ground, I/O ground, etc. These grounds may be isolated from each other except through resistors or capacitors, or may be connected together such as near a ground pin or externally.

While a sine-wave A.C. input has been described, the A.C. input may have a square wave, irregular waves, modulated waves, or other wave shapes. The waves may vary from cycle to cycle, such as when carrying encoded information.

Boost drivers 32, 34 may use other charge-pump circuits or voltage-boosting methods. While a full-wave diode bridge of diode-connected transistors 40, 42, 44, 46 has been shown to provide start-up, a half-wave rectifier could be substituted with less effective start-up operation. Other initialization methods could be used. While bulk connections have been shown, other bulk connections could be substituted, such as connecting all substrates to a fixed voltage, such as from a substrate-bias generator.

While an application of RFID devices has been shown, the low-voltage rectifier could be used in other applications, especially those that have a very low A.C. voltage as an input, whether the A.C. is ultimately from a received RF or other frequency signal, or from some other source. RFID devices may have other block diagrams than that shown in FIG. 1. Comparator 30 could be an op amp, a differential amplifier, a current-steering amplifier, or another kind of amplifier. Comparator 30 may be a high-gain differential amplifier with good output swing, or may be another kind of amplifier or comparator. Comparator 30 could have a pair of p-channel differential transistors, each connected to ground through n-channel transistors such as a current minor, with a p-channel tail transistor to VDD.

The voltages shown and described are but one example. Other values of AC+, AC− may be used, and other transistor properties and sizes may result in other values of VDD and internal nodes. Power capacitor 90 may be external or internal, and may include parasitic capacitances. Blocking capacitors may be added to the AC+ and AC− inputs to block D.C. currents.

The boosted gate voltages applied to the gates of p-channel transistors 20, 22, 24, 26 are designed to cause these transistors to conduct in the linear region, which occurs when the gate voltage is at least one transistor threshold below the lowest of the source and drain voltages, for a p-channel transistor. Since diode-connected transistors 40, 42, 44, 46 have their gates and drains connected togther, they conduct in the saturated region. There may be times and conditions when these transistors operate in other modes, such as sub-threshold conduction or during transitional period of time.

N-channel rather than p-channel transistors may be used for some technologies or processes, and inversions, buffers, capacitors, resistors, gates, or other components may be added to some nodes for various purposes and to tweak the circuit. Timings may be adjusted by adding delay lines or by controlling delays in leading-edge blocking units. Pulse generators could also be added. The inverting and non-inverting inputs to the comparator may be swapped and the polarity of the output reversed. Enabling and disabling the circuit could be accomplished with additional transistors or in other ways. Pass-gate transistors or transmission gates could be added for isolation. Switches may be implemented as n-channel or p-channel transistors, or as transmission gates with parallel p-channel and n-channel transistors. Input resistors and/or capacitors could be added to AC+, AC−, or other nodes, or more complex input filters used. For high voltage applications, the bridge can use Laterally-Diffused Metal-Oxide-Semiconductor (LDMOS) transistors or Micro-Electro-Mechanical Switches (MEMS) with a similar controlling scheme.

The comparator may also use other topologies, such as folded cascode, current minor, two-stage op amps with a differential pair, folded cascode, or current mirror as the first stage, or multiple stages with a differential pair, folded cascode, or current minor as the first stage. While one stage has been shown, two or more stages could be used, and buffering, level shifting, clocking, power-down, or other stages may be added. While a comparator with p-channel differential transistors have been described, p-channel and n-channel transistors may be swapped and the circuit flipped over to use n-channel differential transistors, tail transistors, and p-channel current steering. Bias voltages may be adjusted as well.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A transistor-based bridge rectifier comprising:
a first alternating input;
a second alternating input;
a comparator that compares the first alternating input to a reference to generate a timing signal;
a first boost driver, controlled by the timing signal, for generating a first gate signal, the first gate signal being boosted to a voltage greater than a peak voltage of the first alternating input;
a second boost driver, controlled by the timing signal, for generating a second gate signal, the second gate signal being boosted to a voltage greater than the peak voltage of the first alternating input;
a first forward transistor, having a transistor gate receiving the first gate signal, for conducting current between the first alternating input and an internal power node;
a first reverse transistor, having a transistor gate receiving the second gate signal, for conducting current between the first alternating input and an internal ground node;
a second forward transistor, having a transistor gate receiving the second gate signal, for conducting current between the second alternating input and the internal power node;
a second reverse transistor, having a transistor gate receiving the first gate signal, for conducting current between the second alternating input and the internal ground node;
a first forward diode-connected transistor, having a transistor gate connected to a transistor source/drain node, for conducting current between the first alternating input and the internal power node;
a first reverse diode-connected transistor, having a transistor gate connected to a transistor source/drain node, for conducting current between the first alternating input and the internal ground node;
a second forward diode-connected transistor, having a transistor gate connected to a transistor source/drain node, for conducting current between the second alternating input and the internal power node; and
a second reverse diode-connected transistor, having a transistor gate connected to a transistor source/drain node, for conducting current between the second alternating input and the internal ground node.

2. The transistor-based bridge rectifier of claim 1 wherein the first forward transistor is a p-channel transistor;
wherein the first reverse transistor is a p-channel transistor;
wherein the second forward transistor is a p-channel transistor; and
wherein the second reverse transistor is a p-channel transistor.

3. The transistor-based bridge rectifier of claim 2 wherein the first forward transistor is a p-channel transistor having a substrate connected to the internal power node;
wherein the first reverse transistor is a p-channel transistor having a substrate connected to the first alternating input;
wherein the second forward transistor is a p-channel transistor having a substrate connected to the internal power node; and
wherein the second reverse transistor is a p-channel transistor having a substrate connected to the second alternating input.

4. The transistor-based bridge rectifier of claim 3 wherein the first forward diode-connected transistor is a p-channel transistor;
wherein the first reverse diode-connected transistor is a p-channel transistor;
wherein the second forward diode-connected transistor is a p-channel transistor; and
wherein the second reverse diode-connected transistor is a p-channel transistor.

5. The transistor-based bridge rectifier of claim 4 wherein the first forward diode-connected transistor is a p-channel transistor having a transistor gate connected to the internal power node;
wherein the first reverse diode-connected transistor is a p-channel transistor having a transistor gate connected to the first alternating input;
wherein the second forward diode-connected transistor is a p-channel transistor having a transistor gate connected to the internal power node; and
wherein the second reverse diode-connected transistor is a p-channel transistor having a transistor gate connected to the second alternating input.

6. The transistor-based bridge rectifier of claim 5 wherein the first forward diode-connected transistor is a p-channel transistor having a substrate connected to the internal power node;
wherein the first reverse diode-connected transistor is a p-channel transistor having a substrate connected to the first alternating input;
wherein the second forward diode-connected transistor is a p-channel transistor having a substrate connected to the internal power node; and
wherein the second reverse diode-connected transistor is a p-channel transistor having a substrate connected to the second alternating input.

7. The transistor-based bridge rectifier of claim 6 wherein the first boost driver and the second boost driver each connect to the internal power node and to the internal ground node or to an external ground node;
wherein the first boost driver and the second boost driver are powered by the internal power node.

8. The transistor-based bridge rectifier of claim 7 wherein the comparator receives the internal power node and the external ground node;
wherein the comparator is powered by the internal power node.

9. The transistor-based bridge rectifier of claim 8 wherein the timing signal comprises a true timing signal and a complement timing signal;
wherein the true timing signal connects to the first boost driver and the complement timing signal connects to the second boost driver.

10. The transistor-based bridge rectifier of claim 6 further comprising:
a power capacitor connected between the internal power node and the internal ground node, the power capacitor generating an internal power-supply voltage.

11. The transistor-based bridge rectifier of claim 10 wherein the reference is an external ground node;
wherein the comparator compares the first alternating input to the external ground node.

12. A transistor rectifier comprising:
a pair of alternating-voltage inputs having a first phase and a second phase;
a comparator for comparing one of the pair of alternating inputs to a reference;
a first voltage booster, controlled by the comparator, for generating a first gate signal that alternates between a boosted voltage that exceeds a peak voltage of the pair of alternating-voltage inputs, and a ground;
a second voltage booster, controlled by the comparator, for generating a second gate signal that alternates between a boosted voltage that exceeds a peak voltage of the pair of alternating-voltage inputs, and the ground;
a first transistor having a gate controlled by the first gate signal to conduct during the first phase and switched to isolate during the second phase, the first transistor conducting between a first one of the pair of alternating-voltage inputs and an internal power node during the first phase;
a second transistor having a gate controlled by the first gate signal to conduct during the first phase and switched to isolate during the second phase, the second transistor conducting between a ground and a second one of the pair of alternating-voltage inputs during the first phase;
a third transistor having a gate controlled by the second gate signal to conduct during the second phase and switched to isolate during the first phase, the third transistor conducting between the second one of the pair of alternating-voltage inputs and the internal power node during the second phase;
a fourth transistor having a gate controlled by the second gate signal to conduct during the second phase and switched to isolate during the first phase, the fourth transistor conducting between the ground and the first one of the pair of alternating-voltage inputs during the second phase;
a first diode-connected transistor having a gate and a drain connected together, for conducting between the first one of the pair of alternating-voltage inputs and the internal power node during the first phase during start-up before the first transistor is conducting;
a second diode-connected transistor having a gate and a drain connected together, for conducting between the ground and the second one of the pair of alternating-voltage inputs during the first phase during start-up before the second transistor is conducting;
a third diode-connected transistor having a gate and a drain connected together, for conducting between the second one of the pair of alternating-voltage inputs and the internal power node during the second phase during start-up before the third transistor is conducting; and a fourth diode-connected transistor having a gate and a drain connected together, for conducting between the ground and the first one of the pair of alternating-voltage inputs during the second phase during start-up before the fourth transistor is conducting, whereby diode-connected transistors conduct during start-up until the first, second, third, and fourth transistors are able to conduct after start-up.

13. The transistor rectifier of claim 12 further comprising:
a power input to the comparator, to the first voltage booster, and to the second voltage booster, the power input connected to the internal power node;
a ground input to the comparator, to the first voltage booster, and to the second voltage booster, the ground input connected to the ground.

14. The transistor rectifier of claim 13 wherein the first, second, third, and fourth transistors each comprise a p-channel transistor.

15. The transistor rectifier of claim 13 wherein the first, second, third, and fourth diode-connected transistors each comprise a p-channel transistor.

16. The transistor rectifier of claim 13 wherein the reference to the comparator is the ground or an external ground.

17. The transistor rectifier of claim 13 wherein the first transistor further comprises a substrate node that is connected to the internal power node;
wherein the second transistor further comprises a substrate node that is connected to the second one of the pair of alternating-voltage inputs;
wherein the third transistor further comprises a substrate node that is connected to the internal power node; and
wherein the fourth transistor further comprises a substrate node that is connected to the first one of the pair of alternating-voltage inputs.

18. The transistor rectifier of claim 13 wherein the first diode-connected transistor further comprises a substrate node that is connected to the internal power node;
wherein the second diode-connected transistor further comprises a substrate node that is connected to the second one of the pair of alternating-voltage inputs;
wherein the third diode-connected transistor further comprises a substrate node that is connected to the internal power node; and
wherein the fourth diode-connected transistor further comprises a substrate node that is connected to the first one of the pair of alternating-voltage inputs.

19. The transistor rectifier of claim 13 further comprising:
a power capacitor coupled between the internal power node and the ground;
wherein the internal power node has an averaged power-supply voltage that is about one transistor threshold below the peak voltage of the pair of alternating-voltage inputs;
wherein the boosted voltage is at least one transistor threshold above the peak voltage.

20. A full-wave transistor-bridge rectifier comprising:
alternating input means for receiving an Alternating-Current (AC) signal between a first AC line and a second AC line, the AC signal having a peak voltage;
compare means for comparing a first AC voltage on the first AC line to a reference voltage;
first voltage boost means, controlled by the compare means, for generating a first gate signal that alternated between a boosted voltage that is above the peak voltage and a ground;
second voltage boost means, controlled by the compare means, for generating a second gate signal that alternated between a boosted voltage that is above the peak voltage and a ground;
first transistor means, controlled by the first gate signal, for conducting during a first phase and for isolating during a second phase of the AC signal, the first transistor means for conducting between the first AC line and an internal power node during the first phase;
second transistor means, controlled by the first gate signal, for conducting during the first phase and for isolating during the second phase, the second transistor means conducting between an internal ground and the second AC line during the first phase;
third transistor means, controlled by the second gate signal, for conducting during the second phase and for isolating during the first phase, the third transistor means conducting between the second AC line and the internal power node during the second phase;
fourth transistor means, controlled by the second gate signal, for conducting during the second phase and for isolating during the first phase, the fourth transistor means conducting between the internal ground and the first AC line during the second phase;
first diode-connected transistor means, having a gate and a drain connected together, for conducting between the first AC line and the internal power node during the first phase during start-up before the first transistor means is conducting;
second diode-connected transistor means, having a gate and a drain connected together, for conducting between the internal ground and the second AC line during the first phase during start-up before the second transistor means is conducting;
third diode-connected transistor means, having a gate and a drain connected together, for conducting between the second AC line and the internal power node during the second phase during start-up before the third transistor means is conducting; and
fourth diode-connected transistor means, having a gate and a drain connected together, for conducting between the internal ground and the first AC line during the second phase during start-up before the fourth transistor means is conducting,
whereby diode-connected transistor means conduct during start-up until the first, second, third, and fourth transistor means are able to conduct after start-up.

* * * * *